United States Patent [19]
Wakai et al.

[11] Patent Number: 5,448,360
[45] Date of Patent: Sep. 5, 1995

[54] THREE-DIMENSIONAL IMAGE MEASURING DEVICE

[75] Inventors: Hideyuki Wakai; Toru Suzuki; Keiji Terada; Masato Moriya; Manabu Ando, all of Hiratsuka, Japan

[73] Assignee: Kabushiki Kaisha Komatsu Seisakusho, Tokyo, Japan

[21] Appl. No.: 165,418

[22] Filed: Dec. 13, 1993

[30] Foreign Application Priority Data

Dec. 18, 1992 [JP] Japan ............... 4-338914

[51] Int. Cl.⁶ .................................. G01B 11/24
[52] U.S. Cl. ................... 356/376; 250/201.7
[58] Field of Search ............ 356/372, 373, 375, 376, 356/371, 338, 4, 347; 250/561, 201.2, 201.6, 201.7, 201.8, 237 R; 359/1, 8, 15, 17, 19

[56] References Cited

U.S. PATENT DOCUMENTS

| | | | |
|---|---|---|---|
| 3,592,548 | 7/1971 | Majkowski | 359/1 |
| 4,199,253 | 4/1980 | Ross | 356/376 |
| 4,657,393 | 4/1987 | Stern | 356/376 |
| 5,054,926 | 10/1991 | Dabbs et al. | 356/376 |
| 5,151,609 | 9/1992 | Nakayawa et al. | 356/376 |
| 5,305,092 | 4/1994 | Mimura et al. | 356/376 |

FOREIGN PATENT DOCUMENTS

| | | | |
|---|---|---|---|
| 62-140008 | 6/1987 | Japan . | |
| 0068606 | 3/1989 | Japan | 356/376 |
| 4-1509 | 1/1992 | Japan . | |
| 2144537 | 3/1985 | United Kingdom | 356/376 |

*Primary Examiner*—Hoa O. Pham
*Attorney, Agent, or Firm*—Diller, Ramik & Wight

[57] ABSTRACT

A three-dimensional image measuring device which comprises a light source; a plane image forming unit for forming a plane image in a space in its depth direction on the basis of light emitted from the light source; a scanning unit for moving and scanning the plane image formed by the plane image forming means in its depth direction; an object to be measured disposed in the space where the plane image is formed; a light receiving unit for measuring a strength of light scattered on a surface of the object as the plane image is moved and scanned and; a distance measuring unit for measuring the distance to the object on the basis of the output of the light receiving unit, whereby a three-dimensional image with least reduced invisible area is easily and accurately measured in a short time without using the principle of triangulation.

5 Claims, 4 Drawing Sheets

THREE-DIMENSIONAL IMAGE MEASURING DEVICE

BACKGROUND OF THE INVENTION

1. Field of the Invention

The present invention relates to a three-dimensional image measuring device which obtains three-dimensional coordinate positions of an object without using triangulation.

2. Description of the Related Art

In an active measuring process, light is cast upon on an object, the strength of light scattered on the surface of the object is measured and coordinate positions of the object are measured on the basis of the measured strength values using the principle of triangulation.

This process, however, has the following problems:
1) The distance to the object is required to be measured on the basis of Geometric arrangement of the light source, projection angle of the light and light receiving points (triangulation) and the calculation would be complicated.
2) Since the light source and the light receiving points cannot be arranged on the same axis, an invisible area would be produced.

Published unexamined Japanese patent application Hei 4-1509, entitled "Non-Contact Three-Dimensional Coordinate Measuring Process", discloses a technique which measures without using the principle of triangulation.

This technique relates to a three-dimensional beam scanner capable of focusing a laser beam on any point within the measurement space. The scanner is controlled such that the focus of the beam is at a position on the surface of an object to be measured, at which time the three-dimensional coordinate position of the object is obtained on the basis of a tilt of the laser beam within the reference coordinates and the focal length.

This conventional technique has the following problems:
1) Control is always required to be provided such that the focus of the beam is at a position on the surface of the object.
2) In order to measure the distance with high accuracy, a lens is required which is very shallow in depth of focus, small in aberration, and large in aperture. If the object is at a distance of more than several meters from the measuring device, high measurement accuracy is not obtained.

Apart from the active measurement, there is a passive measurement process for measuring the three-dimensional coordinates of the object by moving the lens toward the object in place of beam irradiation to determine a blur in the image. In this process, a position in an image to which the lens is focused is the focal length of the lens. Thus, the distance from the lens position is determined.

Since, however, this passive measurement process is intended to effect the distance measurement using the lens focus, a lens is required which is very shallow in depth of focus, small in aberration, and large in aperture in order to measure the distance with high accuracy, as in the second conventional technique. If the subject is at a distance of more than several meters from the measuring device, high measurement accuracy is not obtained.

SUMMARY OF THE INVENTION

The present invention is made in view of the above problems. It is an object of the present invention to provide a three-dimensional image measuring device which is capable of measuring a three-dimensional image with a small invisible area easily with high accuracy in a short time without using the principle of triangulation.

To achieve the above object, the present invention provides a three-dimensional image measuring device which comprises a light source; plane image forming means for forming a plane image in a space in its depth direction on the basis of light emitted from the light source; scanning means for moving and scanning the plane image formed by the plane image forming means in its depth direction; an object to be measured disposed in the space where the plane image is formed; light receiving means for measuring the strength of light scattered on a surface of the object as the plane image is moved and scanned; and distance measuring means for measuring a distance to the object on the basis of the output of the light receiving means.

In this invention, a plane image is formed in a space where the object is disposed. The image is moved and scanned in the depth direction. That portion of the plane image of the object to be cut scatters light strongly compared to the remaining portion of the image. The scattered light is received by the light receiving means and the distances to the corresponding portions of the object are measured on the basis of the outputs from the light receiving means. In more detail, as the plane image is scanned, the distance to the plane image present when the strength of the scattered light or contrast is maximum is calculated for each of light receiving elements of the light receiving means and the calculated distances are considered as the distances to the appropriate pixels of the object.

Thus, according to the present invention, a plane image is formed in the space where the object is disposed. The plane image is moved and scanned in the depth direction to scatter light from the object, the scattered light is received, and the distance to the object is measured. Accordingly, only a single easy scan brings about a three-dimensional image in the space. Since the light source and the light receiving points are disposed on substantially the same axis, no invisible area is produced. If the plane image focusing means is a hologram, an aberration-free, shallow-depth of focus bright image is obtained. Thus, high accuracy distance measurement is provided.

DESCRIPTION OF THE PREFERRED EMBODIMENTS

The present invention will be described in detail with respect to embodiments shown in the accompanying drawings.

Figure 1:
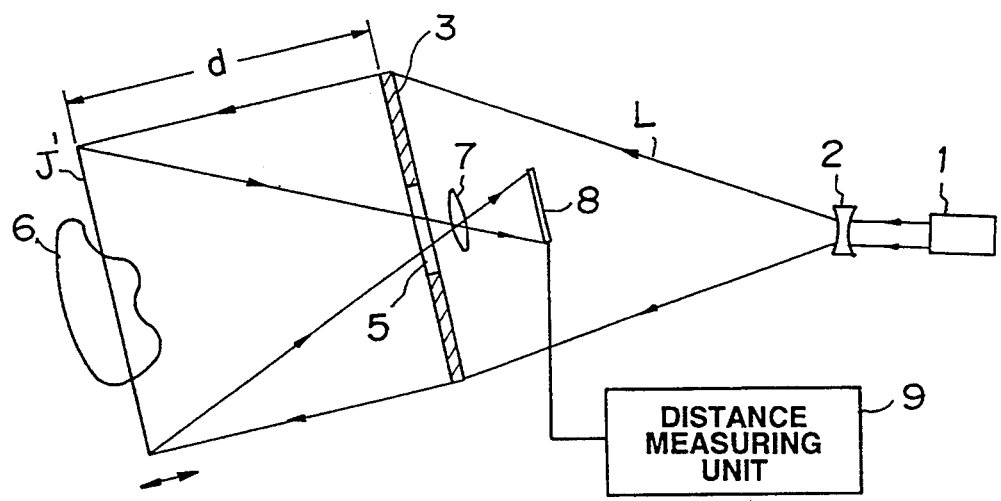
FIG. 1 shows a first embodiment of the present invention.
Figure 2:
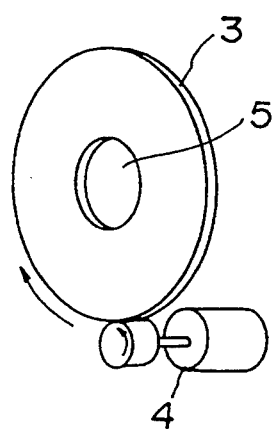
FIG. 2 shows the rotational elements of the hologram of the first embodiment.

FIG. 1 shows an embodiment of the present invention. The laser beam L emitted from a laser light source 1 is diverged by a lens 2 to enter as reference light into a hologram 3, which is rotated by a rotating motor 4 and which has an observation window 5 in the center thereof, as shown in FIG. 2.

In this case, the hologram 3 is subjected to multi-exposure such that plane images are imaged at corresponding different depth distances $d$ in accordance with the respective rotational angles of the hologram 3.

Figure 3A:
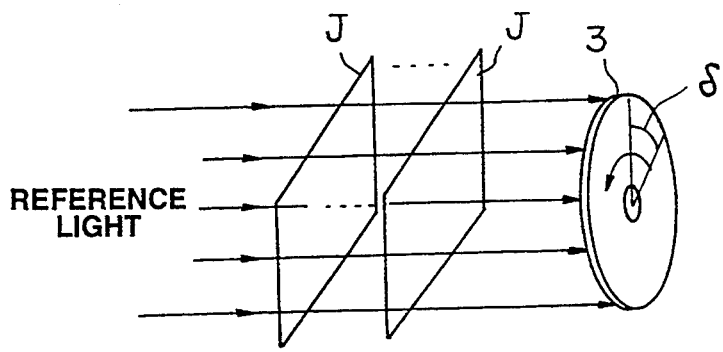
FIGS. 3(a) and 3(b) illustrate multi-exposure of the hologram.

As shown in FIG. 3(a), in order to create such multiple-exposure hologram 3, a plane object J is disposed at a position and irradiated with the reference beam when the hologram 3 is at a rotational angle $\delta$. The plane object J is disposed at a position different from the previous position by changing the rotational angle $\delta$ of the hologram 3 and irradiated with the reference beam. Such exposure is iterated for a plurality of times.

Figure 3B:
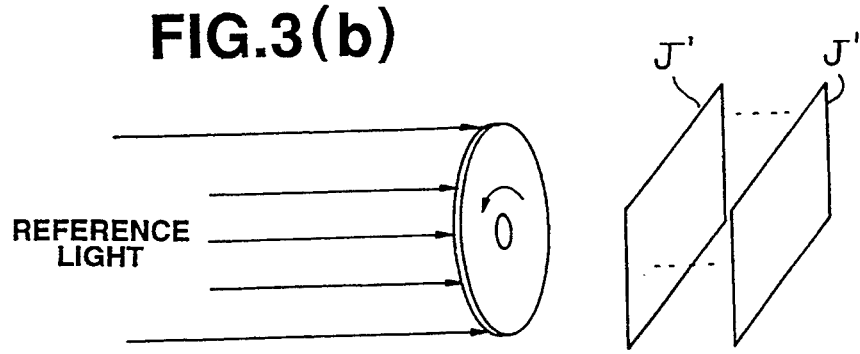

As shown in FIG. 3(b), by rotating the hologram 3, which has been subjected to such multi-exposure, while being irradiated with the reference beam, plane images J′ are imaged at corresponding different depth positions.

Since the hologram 3 which has been subjected to multi-exposure is irradiated with the reference beam from the source 1, as shown in FIG. 1, the plane image J′ is imaged at a position corresponding to the rotational angle of the hologram 3.

Thus, if an object 6 to be measured is disposed in a space where the plane image J′ is formed, that portion of the object 6 cut by the plane image J′ strongly scatters the light.

The scattered light is caused to enter through the observation window 5 and the focusing lens 7 into a two-dimensional image sensor 8, which is composed of a plurality of light receiving elements arranged in a two-dimensional array. The image sensor 8 outputs an opto-electric conversion signal depending on the scattered light entering into a respective one of the light receiving elements. The output signal from the image sensor 8 enters into a distance measuring unit 9, which measures the distance to the object 6.

In more detail, in FIG. 1, the reference light from the source 1 enters the hologram 3, which has been subjected to multi-exposure, while the hologram 3 is being rotated (for example, one rotation) by the motor 4 to move and scan the plane image J′ in the depth direction.

The distance measuring unit 9 sequentially samples the outputs of the respective light receiving elements of the image sensor 8 as the image is moved and scanned. A plane image imaging distance $d$ when the strength of scattered light or contrast is maximum or at a peak period is calculated for each of the light receiving elements (pixels) and the calculated distance $d$ is considered as the distance of the appropriate pixel of the object. Since the distance $d$ corresponds to the distance between the position at which the plane image J is disposed at the multi-exposure and the position of the hologram 3, each distance $d$ is determined for each rotational angle of the hologram 3.

In this way, the distance image of the object 6 is obtained for each of the pixels.

Figure 4:
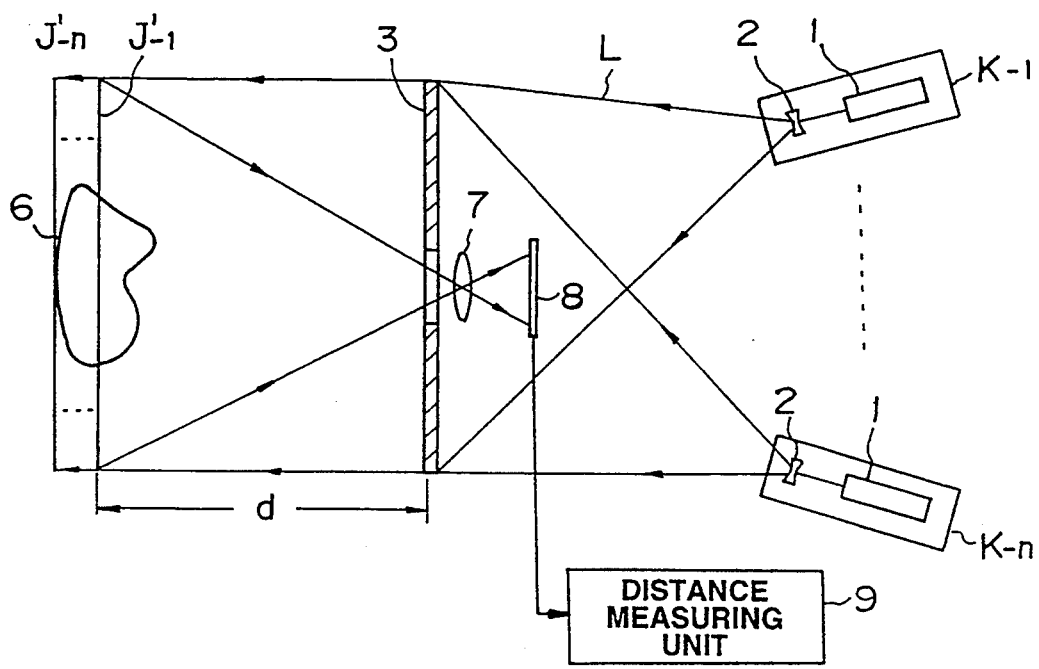
FIG. 4 shows a second embodiment of the present invention.

FIG. 4 shows a second embodiment of the present invention.

In this embodiment, light sources $k$ (each of which includes a laser light source 1 and lens 2) are disposed at different positions. By selecting those light sources sequentially, the hologram 3 is subjected to multi-exposure such that plane images J′ are formed at different positions in a depth direction of the halogen 3. The light source $k$ may be moved in place of the sequential selection of the light sources. Alternatively, light sources may be selectively switched instead.

For example, the hologram may be beforehand subjected to multi-exposure such that the plane image J′-1 is imaged by the light source k-1 and the plane image J′-n is imaged by the light source k-n.

By sequentially one by one lighting up the sources k-1 to k-n at different positions to the hologram 3, which has been subjected to multi-exposure, plane images J′ different in depth are imaged sequentially.

The structure of the device for light reception is similar to that of the embodiment shown in FIG. 1. The respective outputs of the light receiving elements of the image sensor 8 are sequentially sampled in correspondence to the scan of the source $k$. A plane image imaging distance $d$ present when the strength of scattered light or contrast is maximum or at a peak period during the scan is calculated for each of the light receiving elements (pixels) and the resulting distance $d$ is considered as the distance of the appropriate pixel of the object 6. In this way, the distance image of the object 6 is obtained for each pixel as in the previous embodiments.

Figure 5:
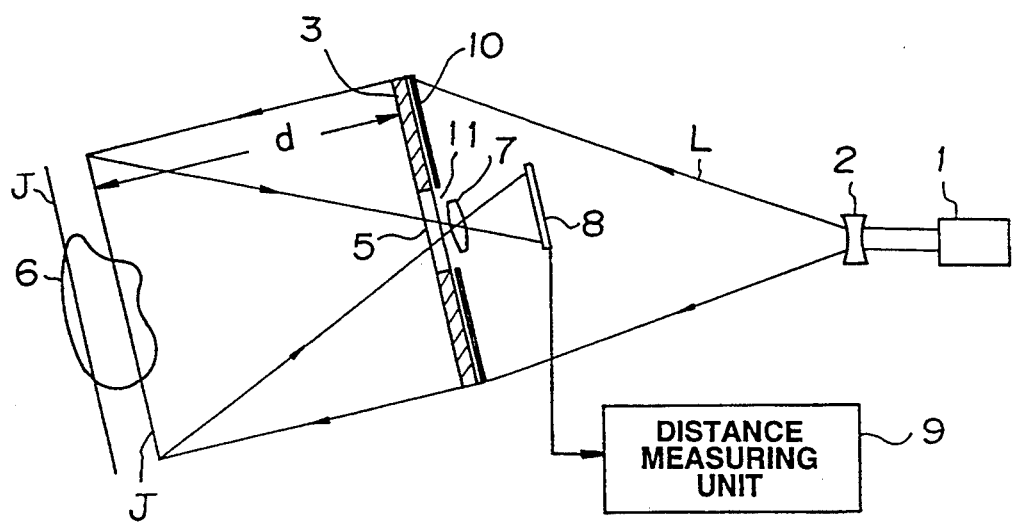
FIG. 5 shows a third embodiment of the present invention.
Figure 6:
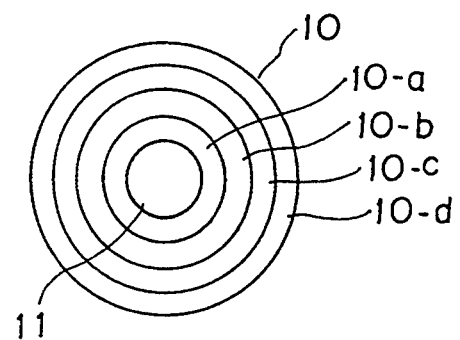
FIG. 6 shows division of a shutter of the third embodiment.

FIG. 5 shows a third embodiment of the present invention. In this embodiment, a liquid crystal shutter 10 is provided in front of the hologram 3. As shown in FIG. 6, the shutter 10 is composed of a plurality of concentric areas 10-a, ..., 10d. Voltages (electric fields) applied to respective areas of the liquid crystal are controlled such that the areas open sequentially one by one. The shutter 10 has an observation window 11 as in the hologram 3.

Figure 7:
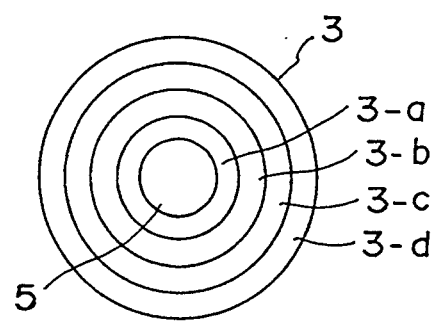
FIG. 7 shows divided exposure of the hologram of the third embodiment.

In this case, as shown in FIG. 7, the hologram 3 is beforehand subjected to partial exposure such that plane images are formed at different distances $d$ in concentric areas 3-a, ..., 3-d similar to those of the shutter 10.

For example, one area of the shutter 10 is opened and reference light is casted on the hologram 3 in a state where a plane object is disposed at a position. Another area of the shutter 10 is then opened and the reference light is casted on the hologram 3 in a state where the plane object is disposed at a position different from the previous position just mentioned. By iterating such exposure process a plurality of times, the hologram 3 which are subjected to partial exposure is formed.

By casting the laser light L from the source 1 on the resulting hologram 3 and sequentially selecting the open areas of the liquid crystal shutter 10, plane images are sequentially imaged at different positions in the depth direction of the hologram.

Thus, in this case, the respective outputs of the light receiving elements of the image sensor 8 are sampled in correspondence to the selection of the open areas of the liquid crystal shutter 10, the plane image imaging distances $d$ present when the strength of the scattered light or contrast is maximum or at a peak period due to the switching of the shutter 10 is calculated for each of the light receiving elements (pixels) and the calculated plane image imaging distances $\underline{d}$ is considered as the distance to the appropriate pixel of the objects 6. In this way, the distances image is obtained for each of the pixels, as same with the previously described embodiment.

While in the above embodiments, the area is divided into concentric areas, the shape of the divided areas is freely determined. While in the embodiments the liquid crystal shutter is used, any other type of shutter may be used as long as the shutter has the same function.

Figure 8:
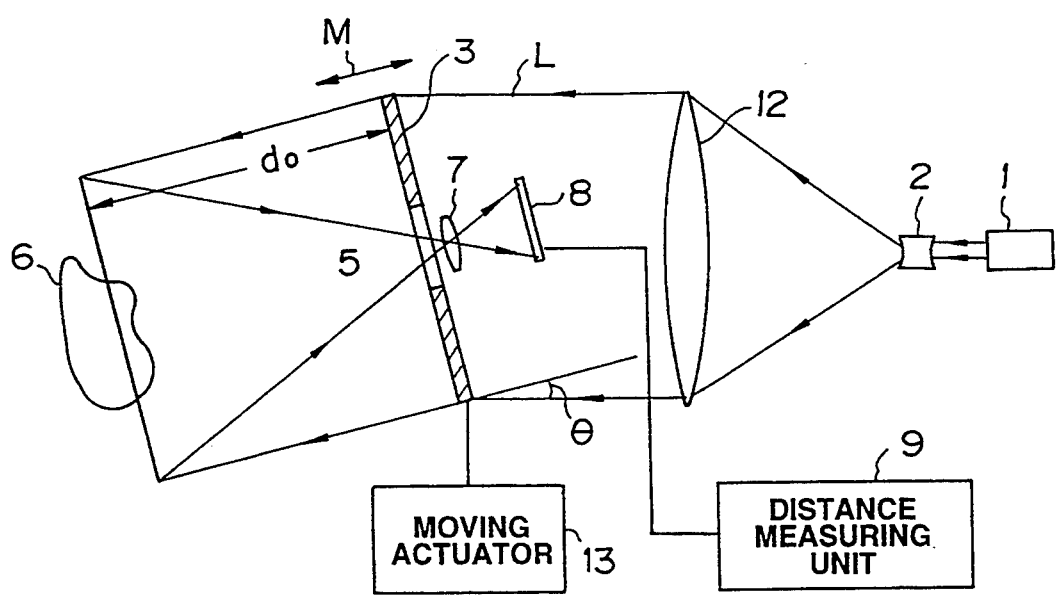
FIG. 8 shows a fourth embodiment of the present invention.

FIG. 8 shows a fourth embodiment. In this embodiment, the laser beam L from the source 1 is amplified by a lens 2, then collimated by a lens 12, and the resulting collimated rays of light are casted as reference light to the hologram 3.

In this case, the hologram 3 is beforehand once subjected to exposure such that when the reference light is casted on the hologram 3, a plane image is formed at a position where the distance between that position of the formed plane image and the position of the hologram 3 is a predetermined distance d0. In this case, the hologram 3 is arranged so as to be moved by a moving actuator 13 in the depth direction (shown by an arrow M) with the angle $\theta$ between the surface of the hologram 3 and the reference light L being constant.

Thus, when the actuator 13 causes the hologram 3 to be moved and scanned, the plane image is moved and scanned in the depth direction (in the direction of the arrow M) such that the plane image is formed at a position where the distance between that position of the plane image and the position of the hologram 3 is d0 at all times.

Thus, the distance measuring unit 9 sequentially samples the respective outputs of the light receiving elements of the image sensor 8 as the hologram 3 is moved and scanned, calculates the sum D of the distance of movement of the hologram 3 (from a reference position) and the plane image imaging distance $\underline{d0}$ present when the strength of the scattered light or the contrast is maximum or at a peak period during the movement and scan of the hologram 3 for each of the light receiving elements (pixels) and the calculated distance D is considered as the distance to the appropriate pixel of the object 6. In this way, the distance image of the object 6 is obtained for the respective pixels.

While in the above-mentioned respective embodiments the laser beam is used as the light source, pure monochromatic light or white light may be used instead. While the lens 2 is used as the beam diverging means, a hologram which has the same function may be used.

What is claimed is:

1. A three-dimensional image measuring device comprising:
   a hologram having a plurality of divided areas which are exposed to form plane images at different positions in a depth direction when a reproduced light is irradiated;
   a light source for irradiating the reproduced light to the hologram;
   shutter means disposed between the light source and the hologram for sequentially changing light transmission areas in correspondence with the plurality of divided areas of the hologram so that the reproduced light is sequentially and selectively irradiated to each one of the plurality of divided areas;
   an object-to-be-measured disposed in a space where the plane images are formed;
   light receiving means for sequentially measuring light intensities scattered upon a surface of the object-to-be measured along with change of the light transmission areas by the shutter means; and
   distance measuring means for measuring a distance to the object-to-be measured on the basis of an output of the light receiving means.

2. The devices according to claim 1 wherein the hologram includes an opening and the light receiving means is disposed at a position where the light scattered on the surface of the object-to-be-measured through the opening of the hologram is received.

3. The device according to claim 2 wherein the divided areas of the hologram are shaped as concentric circles and wherein the opening is formed at a center of the concentric divided areas.

4. The device according to claim 1 wherein the light receiving means comprises a plurality of light receiving elements and wherein the distance measuring means obtains for each element of the light receiving means a distance of the plane image at a time point when an intensity of the scattered light or a contrast becomes maximum during movement and scanning of the plane image, and performs a calculation for making the obtained distance to be a distance of a pixel of the object-to-be-measured.

5. The device according to claim 2 wherein the divided areas of the hologram are shaped as concentric circles.

* * * * *